US010062901B2

(12) United States Patent
Park et al.

(10) Patent No.: US 10,062,901 B2
(45) Date of Patent: Aug. 28, 2018

(54) NEGATIVE ACTIVE MATERIAL, LITHIUM BATTERY INCLUDING THE MATERIAL, AND METHOD OF MANUFACTURING THE MATERIAL

(71) Applicant: Samsung SDI Co., Ltd., Yongin-si, Gyeonggi-do (KR)

(72) Inventors: Sang-Eun Park, Yongin-si (KR); Jae-Myung Kim, Yongin-si (KR); Hyun-Ki Park, Yongin-si (KR); Dong-Hee Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 62 days.

(21) Appl. No.: 14/526,387

(22) Filed: Oct. 28, 2014

(65) Prior Publication Data

US 2015/0162604 A1    Jun. 11, 2015

(30) Foreign Application Priority Data

Dec. 10, 2013    (KR) .................. 10-2013-0153308

(51) Int. Cl.
*H01M 4/36*    (2006.01)
*H01M 10/0525*    (2010.01)
(Continued)

(52) U.S. Cl.
CPC ......... *H01M 4/366* (2013.01); *H01M 4/0471* (2013.01); *H01M 4/133* (2013.01);
(Continued)

(58) Field of Classification Search
CPC .. H01M 4/0471; H01M 4/133; H01M 4/1393; H01M 4/366; H01M 4/62; H01M 4/587
(Continued)

(56) References Cited

U.S. PATENT DOCUMENTS

2006/0147797 A1    7/2006    Wu et al.
2007/0122701 A1    5/2007    Yamaguchi
(Continued)

FOREIGN PATENT DOCUMENTS

CN    102347472 A    2/2012
CN    102569761 A    7/2012
(Continued)

OTHER PUBLICATIONS

Junyao Shen et al., Anatase/rutile TiO2 nanocomposite microspheres with hierarchically porous structures for high-performance lithium-ion batteries, Royal Society of Chemistry, Jul. 31, 2012, vol. 2, pp. 9173-9178.*

(Continued)

*Primary Examiner* — Osei K Amponsah
(74) *Attorney, Agent, or Firm* — Lewis Roca Rothgerber Christie LLP

(57) ABSTRACT

A negative active material, a negative electrode, a lithium battery including the negative active material, and a method of preparing the negative active material. The negative active material includes a crystalline carbonaceous substrate; and metal oxide nanoparticles disposed on a surface of the crystalline carbonaceous substrate, wherein the metal oxide nanoparticles have a rutile structure. The negative active material may be used to improve high temperature stability and lifespan characteristics of a lithium battery.

14 Claims, 9 Drawing Sheets

(51) Int. Cl.
*H01M 4/04* (2006.01)
*H01M 4/587* (2010.01)
*H01M 4/62* (2006.01)
*H01M 4/133* (2010.01)
*H01M 4/1393* (2010.01)

(52) U.S. Cl.
CPC ......... *H01M 4/1393* (2013.01); *H01M 4/587* (2013.01); *H01M 4/62* (2013.01); *H01M 10/0525* (2013.01)

(58) Field of Classification Search
USPC .................................. 429/231.8; 252/182.1
See application file for complete search history.

(56) References Cited

U.S. PATENT DOCUMENTS

| | | | | |
|---|---|---|---|---|
| 2010/0081057 A1* | 4/2010 | Liu | ........................ | B82Y 30/00 429/231.5 |
| 2011/0086271 A1 | 4/2011 | Lee et al. | | |
| 2012/0009477 A1* | 1/2012 | Chen | ..................... | H01M 4/366 429/224 |
| 2012/0231352 A1 | 9/2012 | Pol et al. | | |
| 2012/0251887 A1 | 10/2012 | Han | | |
| 2013/0095384 A1* | 4/2013 | Naoi | ........................ | C01B 25/45 429/221 |
| 2013/0122369 A1* | 5/2013 | Kim | ........................ | H01M 4/38 429/219 |
| 2013/0337335 A1* | 12/2013 | Kim | ..................... | H01M 4/483 429/231.8 |
| 2014/0045060 A1 | 2/2014 | Park et al. | | |
| 2014/0057176 A1 | 2/2014 | Park et al. | | |

FOREIGN PATENT DOCUMENTS

| | | |
|---|---|---|
| EP | 2 450 986 A1 | 5/2012 |
| EP | 2 515 365 A1 | 10/2012 |
| EP | 2648249 A1 | 10/2013 |
| JP | 2000-012026 A | 1/2000 |
| JP | 2000-188134 A | 7/2000 |
| JP | 2006-190642 A | 7/2006 |
| JP | 4380579 B2 | 10/2009 |
| KR | 10-2001-0096073 A | 11/2001 |
| KR | 10-2007-0053140 | 5/2007 |
| KR | 10-2011-0040478 | 4/2011 |
| KR | 10-2011-0049629 A | 5/2011 |
| KR | 10-2014-0022253 | 2/2014 |
| KR | 10-2014-0026855 | 3/2014 |
| WO | WO 2010/014215 A2 | 2/2010 |
| WO | WO 2012/115340 A1 | 8/2012 |

OTHER PUBLICATIONS

Patent Abstracts of Japan and Machine English Translation of JP 2000-012026 A, Jan. 14, 2000, 11 Pages.

Patent Abstracts of Japan and Machine English Translation of JP 2000-188134 A, Jul. 4, 2000, 12 Pages.

Patent Abstracts of Japan and Machine English Translation of Application No. 2005-115577, filed on Apr. 13, 2005, 47 Pages.

EPO Search Report dated May 4, 2015, for corresponding European Patent application 14196997.2, (7 pages).

EPO Office action dated May 19, 2016, for corresponding European Patent application 14196997.2, (5 pages).

Kottegoda, et al., "Enhancement of Rate Capability in Graphite Anode by Surface Modification with Zirconia," Electrochemical and Solid-State Letters, vol. 5, Dec. 2002, pp. A275-A278.

Reyes-Coronado, et al., "Phase-pure $TiO_2$ nanoparticles: anatase, brookite and rutile," Nanotechnology, vol. 19, Mar. 5, 2008, pp. 1-10, doi: 10.1088/0957-4484/19/14/145605.

KIPO Office Action dated Nov. 21, 2016, for corresponding Korean Patent Application No. 10-2013-0153308 (6 pages).

U.S. Office Action dated Apr. 29, 2016, for cross reference U.S. Appl. No. 14/262,518 (12 pages).

EPO Office Action dated Jun. 1, 2017, for corresponding European Patent Application No. 14196997.2 (4 pages).

SIPO Office Action, with English translation, dated Mar. 28, 2018, for corresponding Chinese Patent Application No. 201410752893.5 (31 pages).

* cited by examiner

NEGATIVE ACTIVE MATERIAL, LITHIUM BATTERY INCLUDING THE MATERIAL, AND METHOD OF MANUFACTURING THE MATERIAL

CROSS-REFERENCE TO RELATED APPLICATION

This application claims priority to and the benefit of Korean Patent Application No. 10-2013-0153308, filed on Dec. 10, 2013, in the Korean Intellectual Property Office, the disclosure of which is incorporated herein in its entirety by reference.

BACKGROUND

1. Field

One or more embodiments of the present invention relate to a negative active material, a lithium battery including the negative active material, and a method of manufacturing the negative active material.

2. Description of the Related Art

Lithium secondary batteries used in portable electronic devices for information communication (such as personal digital assistants (PDAs), mobile phones, or notebook computers), electric bicycles, electric vehicles, or the like, have a discharge voltage that is at least twice as high as that of a comparable (conventional) battery, and thus, have a high energy density.

Lithium secondary batteries generate electric energy by oxidation and reduction reactions occurred when lithium ions are intercalated/deintercalated into/from a positive electrode and a negative electrode (each including an active material that enables intercalation and deintercalation of lithium ions), with an organic electrolytic solution or a polymer electrolytic solution interposed between the positive and negative electrodes.

Research is being conducted about various forms of carbonaceous materials (such as synthetic and natural graphite, or hard carbon), which are capable of intercalation/ deintercalation of lithium, and non-carbonaceous materials such as Si.

When a negative electrode material of a lithium secondary battery directly contacts an electrolyte, the electrolyte may undergo reductive cleavage at a low electric potential. Accordingly, during a charging process of lithium, reactivity between the negative electrode material and the electrolyte of the lithium secondary battery may increase to form a thin film on a surface of the negative electrode. Here, the higher the temperature of the reaction in the battery, the greater the reactivity between the negative electrode material and the electrolyte. Due to the thin film, lithium ions and electrons are consumed, thereby deteriorating lifespan characteristics of the lithium secondary battery. Also, the film undergoes exothermal decomposition reaction at a high temperature of about 100° C. or greater, and as the amount of the film increases, the amount of heating increases, which may deteriorate the high temperature stability of a cell. Due to this phenomenon, high temperature stability and lifespan characteristics of a lithium secondary battery may deteriorate.

Accordingly, development of a negative active material having improved high temperature stability and lifespan characteristics is needed.

SUMMARY

An aspect according to one or more embodiments of the present invention is directed toward negative active materials that may improve high temperature stability and lifespan characteristics of lithium batteries.

An aspect according to one or more embodiments of the present invention is directed toward negative electrodes including the negative active materials.

An aspect according to one or more embodiments of the present invention is directed toward lithium batteries including the negative electrodes.

An aspect according to one or more embodiments of the present invention is directed toward methods of preparing the negative active materials.

Additional aspects will be set forth in part in the description which follows and, in part, will be apparent from the description, or may be learned by practice of the presented embodiments.

According to one or more embodiments of the present invention, a negative active material includes:

a crystalline carbonaceous substrate; and metal oxide nanoparticles on a surface of the crystalline carbonaceous substrate.

According to one or more embodiments of the present invention, the metal oxide nanoparticles may have a rutile structure.

According to one or more embodiments of the present invention, the metal oxide nanoparticles may have a rutile structure mixed with an anatase structure.

According to one or more embodiments of the present invention, the metal oxide nanoparticles may include at least one metal oxide of a metal selected from the elements of Group 2 to Group 13.

According to one or more embodiments of the present invention, the metal oxide nanoparticles may include an oxide of at least one metal selected from the group consisting of zirconium (Zr), nickel (Ni), cobalt (Co), manganese (Mn), boron (B), magnesium (Mg), calcium (Ca), strontium (Sr), barium (Ba), titanium (Ti), vanadium (V), iron (Fe), copper (Cu), chromium (Cr), zinc (Zn), molybdenum (Mo), niobium (Nb), tantalum (Ta), and aluminum (Al).

According to one or more embodiments of the present invention, the metal oxide nanoparticles may include a metal oxide represented by Formula 1 below.

$$M_aO_b \qquad \text{Formula 1}$$

in Formula 1,

1≤a≤4, 1≤b≤10, and

M may be at least one selected from the group consisting of titanium (Ti), zirconium (Zr), nickel (Ni), cobalt (Co), manganese (Mn), chromium (Cr), zinc (Zn), boron (B), magnesium (Mg), calcium (Ca), strontium (Sr), barium (Ba), vanadium (V), iron (Fe), copper (Cu), molybdenum (Mo), niobium (Nb), tantalum (Ta), and aluminum (Al).

According to one or more embodiments of the present invention, the metal oxide nanoparticles may include at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

According to one or more embodiments of the present invention, the metal oxide nanoparticles may include titanium oxide having a rutile structure.

According to one or more embodiments of the present invention, the metal oxide nanoparticles may include a titanium oxide having a rutile structure mixed with an anatase structure.

According to one or more embodiments of the present invention, an average diameter of the metal oxide nanoparticles may be about 1 nm to about 30 nm.

According to one or more embodiments of the present invention, the metal oxide nanoparticles may include a coating layer having an island shape (as a discontinuous layer) on a surface of the crystalline carbonaceous substrate.

According to one or more embodiments of the present invention, the crystalline carbonaceous substrate may include at least one of natural graphite, artificial graphite, expandable graphite, graphene, carbon black, and fullerene soot.

According to one or more embodiments of the present invention, the crystalline carbonaceous substrate may have a spherical form, a planar form, a fiber form, a tube form, or a powder form.

According to one or more embodiments of the present invention, an average diameter of the crystalline carbonaceous substrate may be about 1 μm to about 30 μm.

According to one or more embodiments of the present invention, an amount of the metal oxide nanoparticles may be about 0.01 parts by weight to about 10 parts by weight based on 100 parts by weight of the crystalline carbonaceous substrate.

According to one or more embodiments of the present invention, a negative electrode includes the said negative active material.

According to one or more embodiments of the present invention, a lithium battery includes the said negative electrode.

According to one or more embodiments of the present invention, a method of preparing a negative active material includes:

mixing a crystalline carbonaceous substrate, a metal oxide precursor, and a solvent to prepare a mixture solution;

drying the mixture solution to prepare a dried product; and heat treating the dried product.

According to one or more embodiments of the present invention, the metal oxide precursor may be a metal salt including at least one metal selected from the group consisting of titanium (Ti), zirconium (Zr), nickel (Ni), cobalt (Co), manganese (Mn), chromium (Cr), zinc (Zn), boron (B), magnesium (Mg), calcium (Ca), strontinum (Sr), barium (Ba), vanadium (V), iron (Fe), copper (Cu), molybdenum (Mo), niobium (Nb), tantalum (Ta), and aluminum (Al).

According to one or more embodiments of the present invention, a weight ratio of the crystalline carbonaceous substrate to the metal oxide precursor may be about 100:0.01 to about 100:20.

According to one or more embodiments of the present invention, the heat treating may be performed in a nitrogen atmosphere or an air atmosphere at a temperature of 700° C. or greater.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
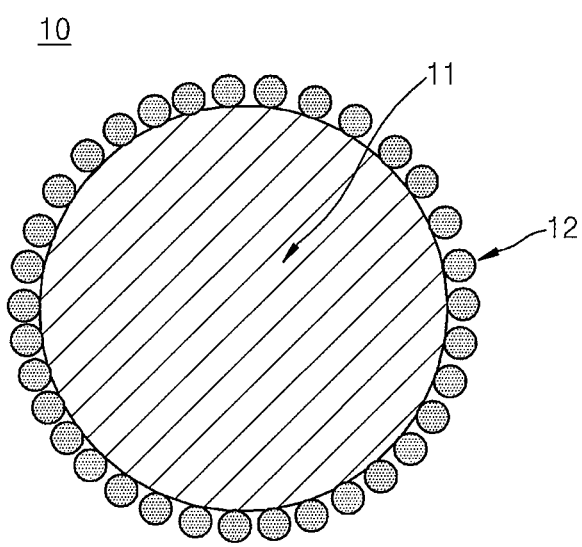
FIG. 1 is a schematic view showing a structure of a negative active material according to an embodiment.

Reference will now be made in detail to embodiments, examples of which are illustrated in the accompanying drawings, wherein like reference numerals refer to like elements throughout. Here, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, embodiments of the present invention will be described in greater detail.

A negative active material according to an embodiment of the present invention includes:

a crystalline carbonaceous substrate; and metal oxide nanoparticles disposed on a surface of the crystalline carbonaceous substrate.

FIG. 1 is a schematic view showing a structure of a negative active material 10 according to an embodiment. As shown in FIG. 1, the negative active material 10 has metal oxide nanoparticles 12 disposed on a surface of a crystalline carbonaceous substrate 11.

The crystalline carbonaceous substrate 11 includes crystalline carbon. Here, the term "carbonaceous substrate" refers to a substrate including about 50 wt % of carbon. For example, the carbonaceous substrate may include at least about 60 wt %, about 70 wt %, about 80 wt %, about 90 wt %, or about 100 wt % of carbon. Also, the term "crystalline" as used herein refers to inclusion of about 50 wt % of a hexagonal crystal lattice in which 3 different carbon atoms are covalently bonded to a carbon atom having an $sp^2$ hybrid orbital. For example, the crystalline carbonaceous substrate 11 may include about 60 wt %, about 70 wt %, about 80 wt %, about 90 wt %, or about 100 wt % of crystalline carbon. A hexahedral crystal lattice structure may have a single layer structure or a multi-layer structure, or may have various deformed structures of a 2-dimensional form due to bending, winding, rolling, partial damage, or the like, and the hexahedral crystal lattice structure may be connected in the form of a soccer ball. A crystal structure of the crystalline carbonaceous substrate 11 is not particularly limited as long as the structure enables a reversible intercalation and deintercalation of lithium ions during charge and discharge processes.

According to an embodiment, the crystalline carbonaceous substrate 11 may be natural graphite, artificial graphite, expandable graphite, graphene, carbon black, fullerene soot, or a combination thereof, but the crystalline carbonaceous substrate 11 is not limited thereto.

Natural graphite is a naturally available graphite such as flake graphite, high crystalline graphite, or microcrystalline (or cryptocrystalline) graphite. Artificial graphite is artificially synthesized graphite, which may be prepared by heat-treating amorphous carbon at a high temperature, and examples of the artificial graphite include primary graphite, electrographite, secondary graphite, and graphite fiber. Expandable graphite refers to graphite prepared by intercalating a chemical such as an acid or a base between layers of the graphite structure, heat-treating the same, and then expanding a vertical layer of a molecular structure. Graphene refers to a single layer graphite. Carbon black is a crystalline material having a smaller-sized regularity than graphite, and when carbon black is heated at a temperature of about 3,000° C. for a long time, carbon black may transform into graphite. Fullerene soot is a carbon compound in which fullerene having a polyhedral bundle formed of 60 or more carbon atoms is included in an amount of about 3 wt %. The crystalline carbonaceous substrate 11 may be formed of one kind of crystalline carbonaceous material or a combination of two or more crystalline carbonaceous materials. For example, natural graphite and/or artificial graphite may be used because a mixture density may be easily increased during the preparation of a negative electrode.

The crystalline carbonaceous substrate 11 may be included in a spherical form, a planar form, a fiber form, a tube form, and/or a powder form. For example, the crystalline carbonaceous substrate 11 may have a spherical form and/or a planar form. Though FIG. 1 shows one embodiment where the crystalline carbonaceous substrate 11 has a spherical form, the crystalline carbonaceous substrate 11 is not limited thereto.

The crystalline carbonaceous substrate 11 having a spherical form may be manufactured by, for example, spheronization of crystalline carbon. For example, the carbonaceous substrate having a spherical structure formed by the spheronization of graphite may have graphite of a layered structure curved or bent, or may have a microstructure formed of a plurality of curved or bent graphite sheets having a scale-like form or scale form.

When the crystalline carbonaceous substrate 11 has a spherical form, a sphericity of the crystalline carbonaceous substrate 11 may about 0.7 to about 1.0. The sphericity refers a value measuring the extent of deformation of a sphere from an ideal sphere, and the value thereof may be in a range of 0 to 1.0, wherein when the value is closer to 1.0, the sphere is closer to the ideal sphere. For example, the sphericity of the crystalline carbonaceous substrate 11 may be 0.8 to 1.0. For example, the sphericity of the crystalline carbonaceous substrate 11 may be 0.9 to 1.0. On the other hand, the sphericity of a carbonaceous substrate having a planar form may be 0.7 or less.

The crystalline carbonaceous substrate 11 may include pores therein when the crystalline carbonaceous substrate 11 is formed into a spherical form through a spheronization process. A porosity of the crystalline carbonaceous substrate 11 may be about 5% to about 30% based on a total volume of the crystalline carbonaceous substrate 11, for example, may be about 10% to about 20%.

An average diameter of the crystalline carbonaceous substrate 11 is not particularly limited, but when the average diameter is too small, the crystalline carbonaceous substrate 11 may be highly reactive to electrolyte, which may deteriorate cycle characteristics, and when the average diameter is too big, dispersion stability of the crystalline carbonaceous substrate 11 during the preparation of a negative electrode slurry may deteriorate such that a surface of the negative electrode may be rough. For example, the average diameter of the crystalline carbonaceous substrate 11 may be about 1 µm to about 30 µm. In one embodiment, for example, the average diameter of the crystalline carbonaceous substrate 11 may be about 5 µm to about 25 µm, or, may be about 10 µm to about 20 µm.

The metal oxide nanoparticles 12 may be disposed on the surface of the crystalline carbonaceous substrate 11.

A metal of the metal oxide in the metal oxide nanoparticles 12 may be at least one selected from the elements of Group 2 to Group 13 in the periodic table of elements. Accordingly, elements of Group 1 and Groups 14 to 16 in the periodic table of elements are not included in the metal of the metal oxide.

For example, the metal of the metal oxide may be at least one metal selected from the group consisting of titanium (Ti), zirconium (Zr), nickel (Ni), cobalt (Co), manganese (Mn), chromium (Cr), zinc (Zn), boron (B), magnesium (Mg), calcium (Ca), strontium (Sr), barium (Ba), vanadium (V), iron (Fe), copper (Cu), molybdenum (Mo), niobium (Nb), tantalum (Ta), and aluminum (Al).

For example, the metal oxide may be represented by Formula 1 below:

$$M_aO_b \quad \text{Formula 1}$$

In Formula 1, $1 \leq a \leq 4$, $1 \leq b \leq 10$, and M is at least one selected from the group consisting of Ti, Zr, Ni, Co, Mn, Cr, Zn, B, Mg, Ca, Sr, Ba, V, Fe, Cu, Mo, Nb, Ta, and Al.

For example, the metal oxide may include at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide. For example, as the metal oxide, $TiO_x$ ($1 \leq x \leq 2$), $Al_2O_3$, $ZrO_2$, or the like may be used. For example, as the metal oxide, $TiO_x$ ($1 \leq x \leq 2$), for example, $TiO_2$ may be used.

The average diameter of the metal oxide nanoparticles 12 may be about 1 nm to about 30 nm, about 5 nm to about 25 nm, or about 10 nm to about 20 nm.

The metal oxide nanoparticles 12 may form a coating layer on the surface of the crystalline carbonaceous substrate 11. As such, the coating layer formed of the metal oxide nanoparticles 12 may exist between the crystalline carbonaceous substrate 11 and the electrolyte to increase the interface stability of the crystalline carbonaceous substrate 11, and thereby improve lifespan characteristics and the high temperature stability.

$TiO_x$ ($1 \leq x \leq 2$), for example, $TiO_2$, has a high capacity retention rate, a low self-discharge rate, and low volumetric expansion characteristics, and has low high temperature heat generation characteristics at a charge voltage of graphite (0.1 V). $TiO_x$ has a small but sufficient lithium ion conductivity between about 1.5 V to about 0 V, and thus, $TiO_x$ may not only act as a barrier for blocking direct contact between the electrolyte and the crystalline carbonaceous substrate 11, but also as a pathway for lithium ions.

The metal oxide nanoparticles 12 may be inactive to lithium. For example, the metal oxide does not react with lithium such that lithium metal oxide may not be formed. In other words, the metal oxide is not a negative active material capable of intercalation/deintercalation of lithium, but a conductor, which provides a simple transfer pathway of lithium ions and/or electrons, and also acts as a protective layer for reducing or preventing a side reaction with the electrolyte. Alternatively, the metal oxide nanoparticles 12 may be an electrical insulator and may form a protective layer that reduces or prevents a side reaction with the electrolyte.

According to an embodiment, the metal oxide nanoparticles 12 may have a rutile structure. The rutile structure may be formed by a titanium oxide having a microcrystalline lattice form, but the rutile structure is not limited thereto.

Figure 2A:
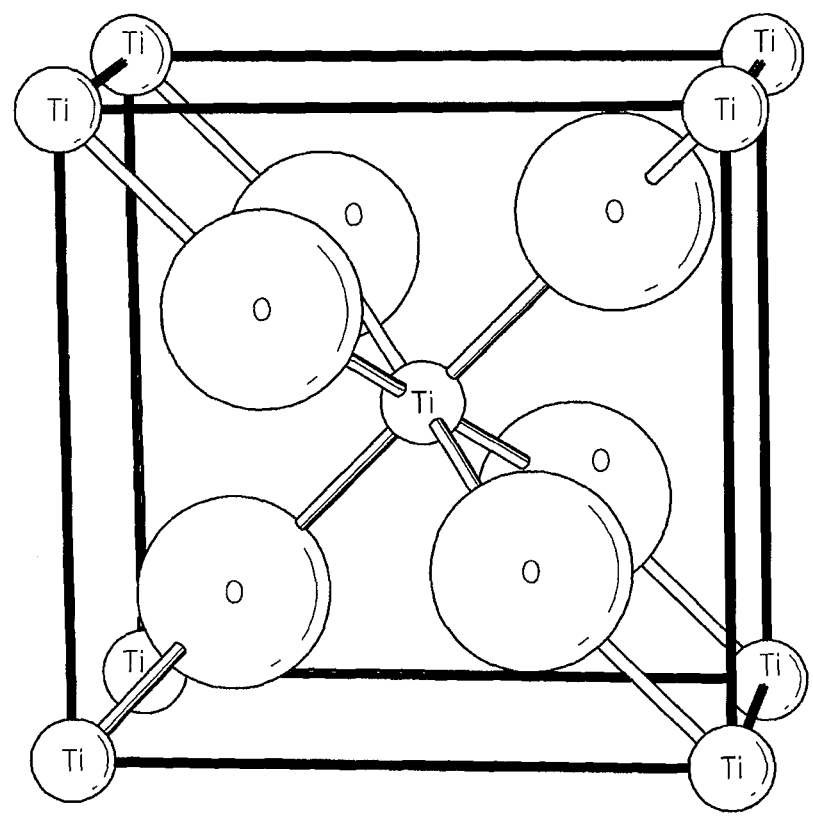
FIG. 2A shows a structure of a rutile unit cell and FIG. 2B shows a structure of an anatase unit cell.
Figure 2B:
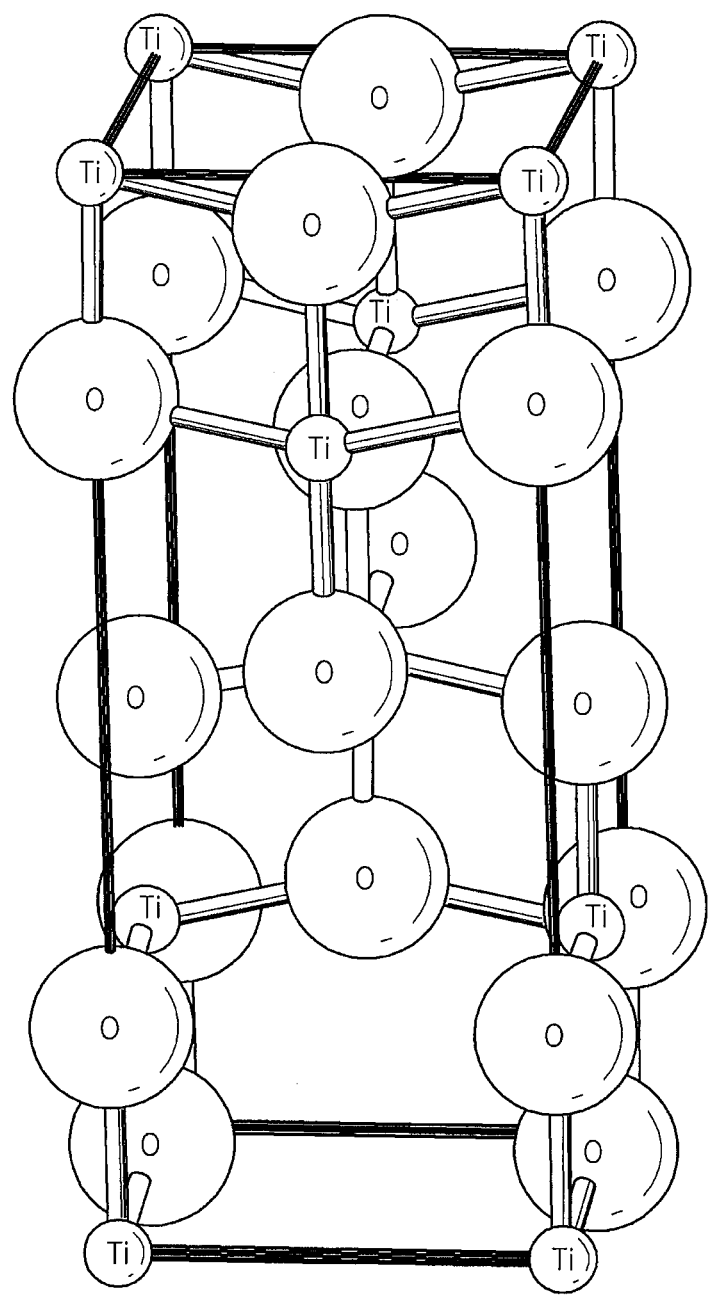

FIG. 2A shows a structure of a rutile unit cell, and FIG. 2B shows a structure of an anatase unit cell. The conclusion that metal oxide nanoparticles having a rutile structure may have a better high temperature stability than metal oxide nanoparticles having an anatase structure may be based on the following embodiments.

According to an embodiment, metal oxide nanoparticles may have a combination (mixed) structure of a rutile structure and an anatase structure. For example, metal oxide nanoparticles may include titanium oxide having a structure of a rutile structure and an anatase structure.

A method of forming the rutile structure may be any suitable method known in the art, and is not particularly limited. To prepare the metal oxide nanoparticles having a rutile structure, for example, a crystalline carbonaceous substrate may be coated with a coating solution including a metal oxide precursor and then heat treated at a temperature of about 700° C. or greater. The rutile structure may be identified by x-ray diffraction spectroscopy.

In a negative active material, an amount of the metal oxide nanoparticles may be about 0.01 parts by weight to about 10 parts by weight based on 100 parts by weight of the crystalline carbonaceous substrate. For example, the amount of the metal oxide nanoparticles may be about 0.1 wt % to about 5 wt % or about 0.5 wt % to about 2 wt %, based on the total weight of the negative active material. In one embodiment, when the amount of the coating layer is in the range described above, lifespan characteristics of a lithium battery is effectively improved.

As described above, the negative active material, in which the metal oxide nanoparticles are disposed on the surface of the crystalline carbonaceous substrate, may increase the interface stability between the crystalline carbonaceous substrate and the electrolyte to have (improve) a long lifespan, a high temperature lifespan, and a high temperature stability.

A negative electrode according to another embodiment includes the negative active material described above.

The negative electrode may be prepared by, for example, molding a negative active material composition including a negative active material, a binder, and optionally, a conductive agent in a set or predetermined shape, or coating the negative active material composition on a current collector such as a copper foil.

In one embodiment, a negative active material composition including a mixture of a negative active material, a conductive agent, a binder, and a solvent is prepared. The negative active material composition is directly coated on a metal current collector to manufacture a negative electrode plate. Alternatively, the negative active material composition may be cast on a separate support, and then a film may be peeled off from the support and then laminated on a metal current collector to manufacture a negative electrode plate. The form of the negative electrode is not limited to the forms listed above and may differ from the forms described above.

The negative active material composition may further include a negative electrode material conventionally used as the negative active material in a lithium battery of the related art, in addition to the negative active material described above. For example, the negative active material composition may further include at least one selected from the group consisting of lithium metal, a metal alloyable with lithium, a transition metal oxide, a non-transitional metal oxide, and a carbonaceous material.

For example, the metal alloyable with lithium may be silicon (Si), tin (Sn), aluminum (Al), germanium (Ge), lead (Pb), bismuth (Bi), antimony (Sb), a Si—Y alloy (wherein, Y is an alkali metal, an alkaline earth metal, a Group 13 element other than Si, a Group 14 element, a transition metal, a rare earth metal element, or a combination thereof), and a Sn—Y alloy (wherein Y is an alkali metal, an alkaline earth metal, a Group 13 element, a Group 14 element other than Sn, a transition metal, a rear earth metal element, or a combination thereof). The element Y may be magnesium (Mg), calcium (Ca), strontium (Sr), barium (Ba), radon (Ra), scandium (Sc), yttrium (Y), titanium (Ti), zirconium (Zr), hafnium (Hf), rutherfordium (Rf), vanadium (V), niobium (Nb), tantalum (Ta), dubium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be lithium titanium oxide, vanadium oxide, or lithium vanadium oxide.

For example, the transition metal oxide may be $SnO_2$ or $SiO_x$ (0<x<2).

Examples of the carbonaceous material include crystalline carbon, amorphous carbon, or a mixture thereof. The crystalline carbon may be graphite such as natural graphite or synthetic graphite having an irregular form, a planar form, a flake form, a spherical form, or a fiber form, and the amorphous carbon may be soft carbon (low temperature calcined carbon), hard carbon, mesophase pitch carbide, calcined coke, or a combination thereof.

The binder may be any suitable binder used in the art such as polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene terpolymer (EPDM), sulfonated ethylene-propylene-diene terpolymer, styrene butadiene rubber, fluoride rubber, or various copolymers, but the binder is not limited thereto and may be any suitable binder used in the art. An amount of the binder may be about 1 part by weight to about 50 parts by weight based on 100 parts by weight of the negative active material. In one embodiment, the amount of the binder may be about 1 part by weight to about 30 parts by weight, 1 part by weight to about 20 parts by weight, or about 1 part by weight to about 15 parts by weight based on 100 parts by weight of the negative active material.

The negative electrode may optionally further include a conductive agent to provide a conductive pathway to the negative active material, to thereby further improve electrical conductivity. The conductive agent may be acetylene black, Ketjen black, natural graphite, artificial graphite, carbon black, acetylene black, carbon fiber, or the like; a metal powder or metal fiber of copper, nickel, aluminum, or silver; or a mixture of one or more (polymeric) conductive materials such as polyphenylene derivative. However, the conductive agent is not limited thereto, and any suitable conductive agent used in the art may be used. Also, the crystalline carbonaceous material may be further added as the conductive agent. An amount of the conductive agent may be appropriately controlled. For example, the conductive agent may be added in such an amount that a weight ratio of the negative active material to the conductive agent is in a range of about 99:1 to about 90:10.

The solvent may be N-methylpyrrolidone (NMP), acetone, water, or the like, but the solvent is not limited thereto and may be any suitable solvent used in the art.

Amounts of the negative active material, the conductive agent, the binder, and the solvent are amounts suitable for a lithium battery. One or more of the conductive agent, the binder, and the solvent may be omitted depending on the use and composition of a lithium battery.

Also, the current collector may be formed in a thickness of about 3 μm to about 500 μm. The current collector is not particularly limited as long as the current collector does not cause a chemical change in a battery and has conductivity. Examples of a suitable material that forms the current collector are copper, stainless steel, aluminum, nickel, titanium, calcined carbon, copper and stainless steel that are surface-treated with carbon, nickel, titanium, silver, or the like, an alloy of aluminum and cadmium, etc. Also, an uneven micro structure may be formed on the surface of the current collector to enhance a binding strength to the negative active material. Also, the current collector may be used in various forms including a film, a sheet, a foil, a net, a porous structure, a foaming structure, a non-woven structure, etc.

A lithium battery according to an embodiment includes a negative electrode including the negative active material. The lithium battery may be manufactured as follows:

First, a negative electrode is prepared according to a method of preparing the negative electrode.

Then, a positive active material composition, in which a positive active material, a conductive agent, a binder, and a solvent are mixed, is prepared. The positive active material composition is directly coated and dried on a metal current collector to prepare a positive electrode plate. Alternatively, the positive active material composition may be cast on a separate support and then a film peeled off from the support may be laminated on a metal current collector to manufacture a positive electrode plate.

The positive active material may necessarily include at least one selected from the group consisting of lithium cobalt oxide, lithium nickel cobalt manganese oxide, lithium nickel cobalt aluminum oxide, lithium iron phosphate, and lithium manganese oxide, but the positive active material is not necessarily limited thereto and may be any suitable positive active material used in the art.

For example, at least one compound represented by any one formula of $Li_aA_{1-b}L_bD_2$ (wherein, $0.90 \le a \le 1.8$ and $0 \le b \le 0.5$); $Li_aE_{1-b}L_bO_{2-c}D_c$ (wherein, $0.90 \le a \le 1.8$, $0 \le b \le 0.5$, and $0 \le c \le 0.05$); $LiE_{2-b}L_bO_{4-c}D_c$ (wherein, $0 \le b \le 0.5$ and $0 \le c \le 0.05$); $Li_aNi_{1-b-c}Co_bL_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Co_bL_cO_{2-\alpha}M_\alpha$ (wherein, $0.90 \le a \le 1.8$, $0 \le b \le 0.5$, $0 \le c \le 0.05$, and $0 < \alpha < 2$); $Li_aNi_{1-b-c}Co_bL_cO_{2-\alpha}M_2$ (wherein, $0.90 \le a \le 1.8$, $0 \le b \le 0.5$, $0 \le c \le 0.05$, and $0 < \alpha < 2$); $Li_aNi_{1-b-c}Mn_bL_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Mn_bL_cO_{2-\alpha}M_\alpha$ (wherein, $0.90 \le a \le 1.8$, $0 \le b \le 0.5$, $0 \le c \le 0.05$, and $0 < \alpha < 2$); $Li_aNi_{1-b-c}Mn_bL_cO_{2-\alpha}M_2$ (wherein, $0.90 \le a \le 1.8$, $0 \le b \le 0.5$, $0 \le c \le 0.05$, and $0 < \alpha < 2$); $Li_aNi_bE_cG_dO_2$ (wherein, $0.90 \le a \le 1.8$, $0 \le b \le 0.9$, $0 \le c \le 0.5$, and $0.001 \le d \le 0.1$); $Li_aNi_bCo_cMn_dGeO_2$ (wherein, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001 \le b \le 0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiRO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$ may be used.

In the formulae above, A is Ni, Co, Mn, or a combination thereof; L is Al, Ni, Co, Mn, Cr, Fe, Mg, Sr, V, a rare earth metal element, or a combination thereof; D is O, F, S, P, or a combination thereof; E is Co, Mn, or a combination thereof; M is F, S, P, or a combination thereof; G is Al, Cr, Mn, Fe, Mg, lanthanum (La), cerium (Ce), Sr, V, or a combination thereof; Q is Ti, Mo, Mn, or a combination thereof; R is Cr, V, Fe, Sc, Y, or a combination thereof; and J is V, Cr, Mn, Co, Ni, Cu, or a combination thereof.

The compound may have a coating layer thereon, or the compound and a compound having a coating layer thereon may be mixed together. The coating layer may include a coating element compound of an oxide of a coating element, a hydroxide of the coating element, an oxyhydroxide of the coating element, an oxycarbonate of the coating element, or a hydroxycarbonate of the coating element. The compound forming the coating layer may be amorphous or crystalline. The coating element included in the coating layer may be Mg, Al, Co, potassium (K), sodium (Na), calcium (Ca), Si, Ti, V, Sn, Ge, gallium (Ga), B, arsenic (As), Zr, or a combination thereof. A method of forming the coating layer may be any suitable method (for example, spray coating or immersion) that does not negatively affect properties of the positive electrode by using the element in the compound, and the method is known to one of ordinary skill in the art and thus, the description thereof will not be repeated herein.

For example, $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \le x \le 0.5$, $0 \le y \le 0.5$), $LiFeO_2$, $V_2O_5$, TiS, or MoS may be used.

The conductive agent, the binder, and the solvent in the positive active material composition may be the same as those in the negative active material composition. Also, a plasticizer may be further added to the positive active material composition and/or negative active material composition to form pores inside an electrode plate.

Amounts of the positive active material, the conductive agent, the binder, and the solvent are amounts generally used in a lithium battery. One or more of the conductive agent, the binder, and the solvent may be omitted depending on use and composition of a lithium battery.

Then, a separator to be inserted between the positive electrode and the negative electrode is prepared. The separator may be any suitable separator used for a lithium battery. The separator may have a low resistance to migration of ions of an electrolyte and a suitable (e.g., an excellent) electrolytic solution-retaining capability. For example, the separator may be selected from the group consisting of glass fiber, polyester, Teflon, polyethylene, polypropylene, polytetrafluoroethylene (PTFE), and a combination thereof, each of which may be nonwoven or woven. For example, a separator that may be rolled, such as polyethylene or polypropylene, may be used in a lithium ion battery, and a separator having a suitable (e.g., an excellent) solution-retaining capability may be used in a lithium ion polymer battery. For example, the separator may be prepared by the method described below.

A polymer resin, a filler, and a solvent are mixed to prepare a separator composition. The separator composition may be directly coated and then dried on an electrode to prepare a separator. Alternatively, the separator composition may be cast and then dried on a support, and a separator film peeled off from the support may be laminated on the electrode to prepare a separator.

The polymer resin used for preparing the separator is not particularly limited and any suitable material used (utilized) as a separator for an electrode plate may be used. For example, vinylidene fluoride/hexafluoropropylene copolymer, polyvinylidene fluoride (PVDF), polyacrylonitrile, polymethyl methacrylate, or a combination thereof may be used.

Then, an electrolyte is prepared.

The electrolyte includes a non-aqueous electrolyte and a lithium salt. The non-aqueous electrolyte may be a non-aqueous electrolyte, an organic solid electrolyte, or an inorganic solid electrolyte.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethyl sulfoxide, 1,3-dioxolane, 4-methyl-dioxolane, formamide, N, N-dimethyl formamide, acetonitrile, nitromethane, methyl formate, methyl acetate, phosphoric acid triester, trimethoxymethane, a dioxolane derivative, sulfolane, methyl sulfolane, 1,3-dimethyl-2-imidazolinone, a propylene carbonate derivative, a tetrahydrofuran derivative, ether, methyl propionate, or ethyl propionate.

The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, or a polymer containing an ionic dissociation group.

The inorganic solid electrolyte may be, for example, Li nitride, halogenide, sulfide, or silicate, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiON, or $Li_3PO_4$—$Li_2S$—$SiS_2$.

The lithium salt may be any suitable salt used in a lithium battery. As a material that may be thoroughly dissolved in the non-aqueous electrolyte, for example, at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, 4-phenyl boric acid lithium, lithium imide, etc., may be used.

Lithium batteries may be categorized into lithium ion batteries, lithium ion polymer batteries, or lithium polymer batteries, according to a separator used and an electrolyte used. Lithium batteries may also be categorized into cylindrical lithium batteries, rectangular lithium batteries, coin-shaped lithium batteries, or pouch-shaped lithium batteries, according to the shape thereof. Lithium batteries may also be categorized as bulk lithium batteries or thin layer lithium batteries, according to the size thereof. The lithium batteries may also be primary batteries or secondary batteries.

A method of manufacturing a lithium battery is known to one of ordinary skill in the art, and thus, will not be described in more detail herein.

Figure 3:
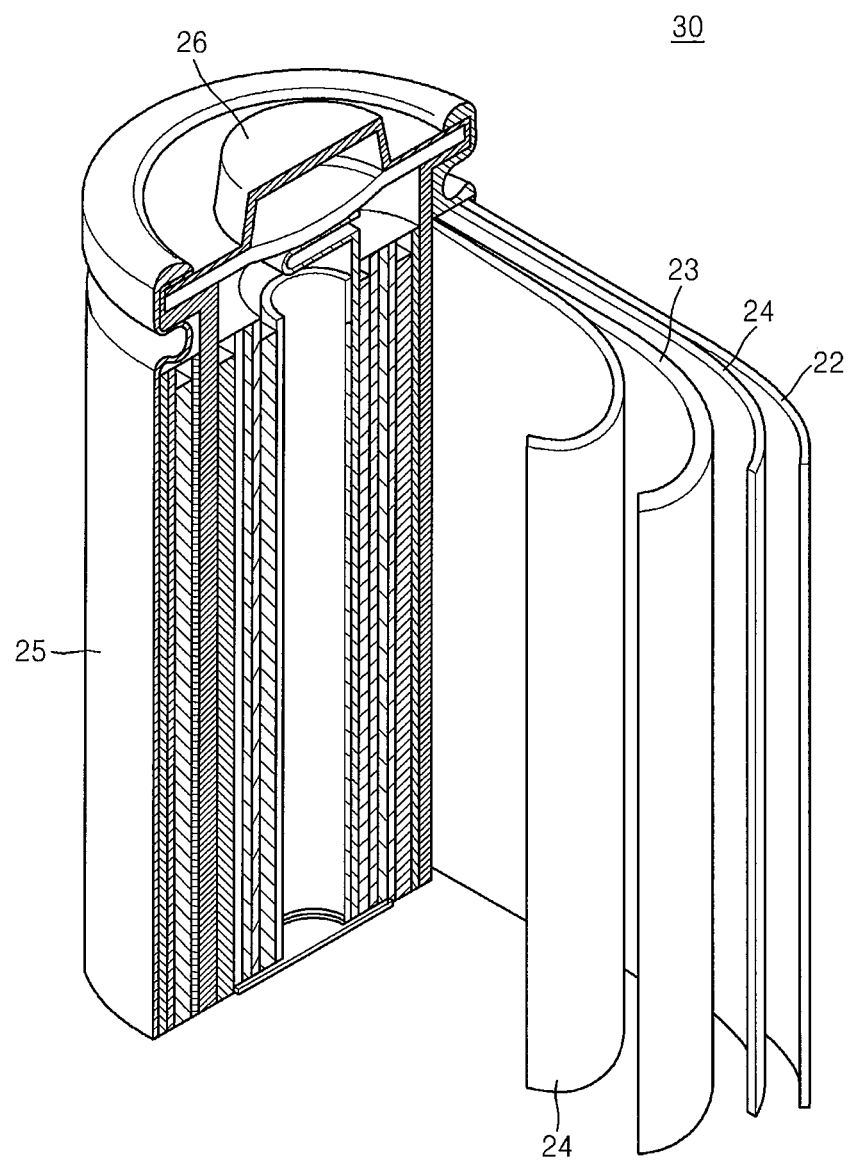
FIG. 3 is a schematic view showing a structure of a lithium battery according to an embodiment.

FIG. 3 is a schematic view showing a structure of a lithium battery 30 according to an embodiment.

Referring to FIG. 3, the lithium battery 30 includes a positive electrode 23, a negative electrode 22, and a separator 24 interposed between the positive and negative electrodes 22 and 23. The positive electrode 23, the negative electrode 22, and the separator 24 are wound or folded to be housed in a battery case 25. Then, an electrolyte is injected into the battery case 25, followed by sealing the battery case 25 with an encapsulation member 26, thereby completing the manufacture of the lithium battery 30. The battery case 25 may be a cylindrical, a rectangular, or a thin film case. The lithium battery 30 may be a lithium ion battery.

A lithium battery according to an embodiment may be used in an application such as an electric vehicle that requires high capacity, high power output, and high-temperature driving, in addition to existing mobile phones or portable computers. Also, the lithium battery may be combined with an existing internal-combustion engine, a fuel cell, a super capacitor, or the like, for use in a hybrid vehicle or the like. For example, the lithium battery has excellent high rate capability and lifespan characteristics and thus, is suitable for an electric vehicle (EV). For example, the lithium battery is suitable for a plug-in hybrid electric vehicle (PHEV).

A method of preparing a negative active material according to another embodiment includes:

mixing a crystalline carbonaceous substrate, a metal oxide precursor, and a solvent to prepare a mixture solution;

drying the mixture solution to prepare a dried product; and heat treating the dried product.

The metal oxide precursor may be a metal salt including at least one metal selected from the group consisting of Ti, Zr, Ni, Co, Mn, Cr, Zn, Mo, Ta, B, Mg, Ca, Sr, Ba, V, Fe, Cu, and Al. The metal salt may be a hydride, an oxyhydride, an alkoxide, a sulfate, a nitrate, and/or a carbonate.

For example, metal alkoxide may be used as a metal oxide derivative. The metal alkoxide may be an organic metal compound in which an alkoxide group is coordinated to a metal ion and may be in a sol form.

For example, the metal alkoxide may be represented by Formula 2 below.

$$M(OR)_x \qquad \text{Formula 2}$$

wherein, $1 \leq x \leq 5$ and M is selected from the group consisting of Ti, Zr, Ni, Co, Mn, Cr, Zn, B, Mg, Ca, Sr, Ba, V, Fe, Cu, Mo, Nb, Ta, and Al.

A weight ratio of the crystalline carbonaceous substrate to the metal oxide precursor may be about 100:0.01 to about 100:20, for example, about 100:0.01 to about 100:10, about 100:0.1 to about 100:5, or about 100:0.1 to about 100:1. When the amount of the metal alkoxide is too small, an amount of the coating may be small and thus, coating effects may be small, and when the amount of the metal alkoxide is too great, the specific capacity of the battery may decrease.

The solvent may be water, alcohol, or a combination thereof, and the alcohol may be a C1-C4 lower alcohol, examples of which are methanol, ethanol, isopropanol, or a combination thereof. However, the solvent is not limited thereto, and any suitable solvent known in the related art that may be used to achieve the objective of the manufacturing method may be utilized.

In the manufacturing method described above, the crystalline carbonaceous substrate, the metal oxide precursor, and the solvent may be mixed to prepare a mixture solution, the mixture solution may be dried to obtain a dried product, and the dried product may be heat treated to obtain a negative active material in which metal oxide nanoparticles are formed on the surface of the crystalline carbonaceous substrate.

According to an embodiment, the heat treatment may be performed in a nitrogen or atmospheric (air) environment at a temperature of 700° C. or greater. At a heat treatment temperature of 700° C. or greater, a rutile phase may be formed, and at 700° C. or less, only an anatase phase may be obtained. For example, when the heat treatment temperature is 700° C. or greater but less than 800° C., a mixture of both the anatase phase and the rutile phase may be obtained, and when the heat treatment temperature is 800° C. or greater, metal oxide nanoparticles, in which only the rutile phase is present, may be formed. According to an embodiment, the heat treatment may be performed at a temperature of about 700° C. to about 900° C. for about 30 minutes to about 10 hours.

The manufacturing method may further include grinding a heat treatment product obtained from the heat treatment.

Also, the negative active material may be prepared by a dry method including mechanically mixing the metal oxide particles with the crystalline carbonaceous substrate to form a coating layer including the metal oxide nanoparticles on the crystalline carbonaceous substrate, in addition to the wet method described above. The mixing method may be a mechanofusion method or the like. Also, the dry method may further include forming the metal oxide nanoparticles on the crystalline carbonaceous substrate and then heat treating the same.

Hereinafter, example embodiments will be described in more detail with reference to examples. However, the examples are for illustrative purposes only and do not limit the scope.

Preparing a Negative Active Material

MANUFACTURING EXAMPLE 1

0.5 wt % Rutile Coating Phase

As a carbonaceous substrate, 25 g of natural graphite powder (a product of Hitachi Chemical) having an average diameter of about 10 μm, and 0.44 g of titanium isopropoxide ((Ti(OCH(CH$_3$)$_2$)$_4$, a product of Aldrich, and product No: 205273) were added to 200 ml of isopropyl alcohol and then mixed to prepare a mixture solution. In a heatable stirrer, the mixture solution was stirred at a temperature of 100° C. at 300 rpm while removing a solvent to obtain a dried powder. The dried powder was calcined in nitrogen (N$_2$) atmosphere at a temperature of 800° C. for 1 hour to obtain a calcined product. The calcined product was pulverized to prepare a negative active material coated with TiO$_2$ nanoparticles having a rutile phase in an amount of 0.5 wt % on a surface of the natural graphite.

MANUFACTURING EXAMPLE 2

0.5 wt % Rutile+Anatase Coating Phases

A negative active material was prepared in the same manner as in Manufacturing Example 1, except that a calcination temperature was changed to 700° C.

COMPARATIVE MANUFACTURING EXAMPLE 1

0.5 wt % Anatase Coating Phase

A negative active material was prepared in the same manner as in Manufacturing Example 1, except that a calcination temperature was changed to 600° C.

COMPARATIVE MANUFACTURING EXAMPLE 2

Without Coating Treatment

Natural graphite (a product of Hitachi Chemical) having an average diameter of about 10 μm without any coating treatment on the surface thereof was used as a negative active material.

EVALUATION EXAMPLE 1

Analysis of Coating State

Figure 4A:
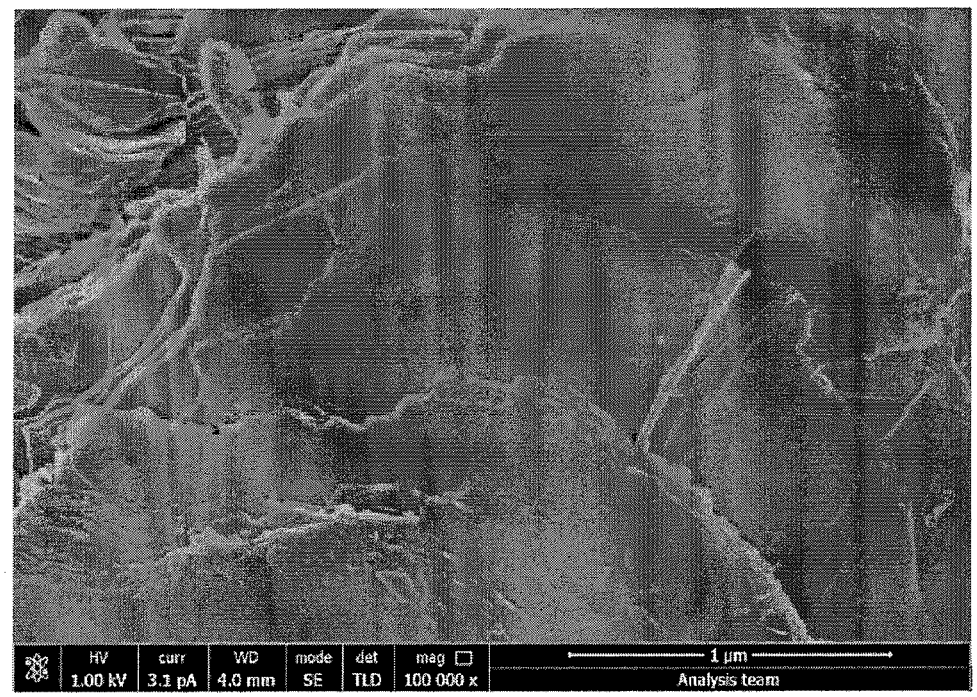
FIGS. 4A and 4B are Field Emission Scanning Electron Microscope (FE-SEM) images of graphite substrates before and after heat treatment in Manufacturing Example 1.
Figure 4B:
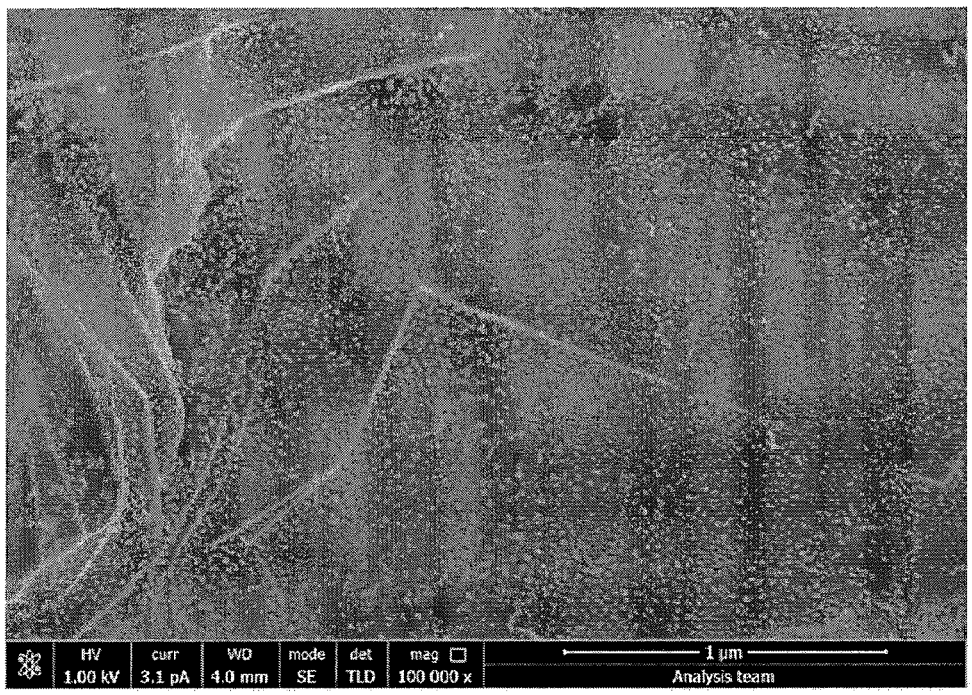

To analyze a coating state of the negative active material prepared in Manufacturing Example 1, Field Emission Scanning Electron Microscope (FE-SEM) images of a natural graphite substrate before and after calcination are shown in FIGS. 4A and 4B.

As shown in FIGS. 4A and 4B, it may be concluded that TiO$_2$ nanoparticles were coated as an island shape (as a discontinuous layer) on the surface of the natural graphite after the calcination. The graphite negative active material coated with the TiO$_2$ nanoparticles as an island shape may have better lithium ion mobility than the graphite negative active material coated with the TiO$_2$ nanoparticles in a complete (or continuous) layer form.

EVALUATION EXAMPLE 2

XRD Analysis

Figure 5:
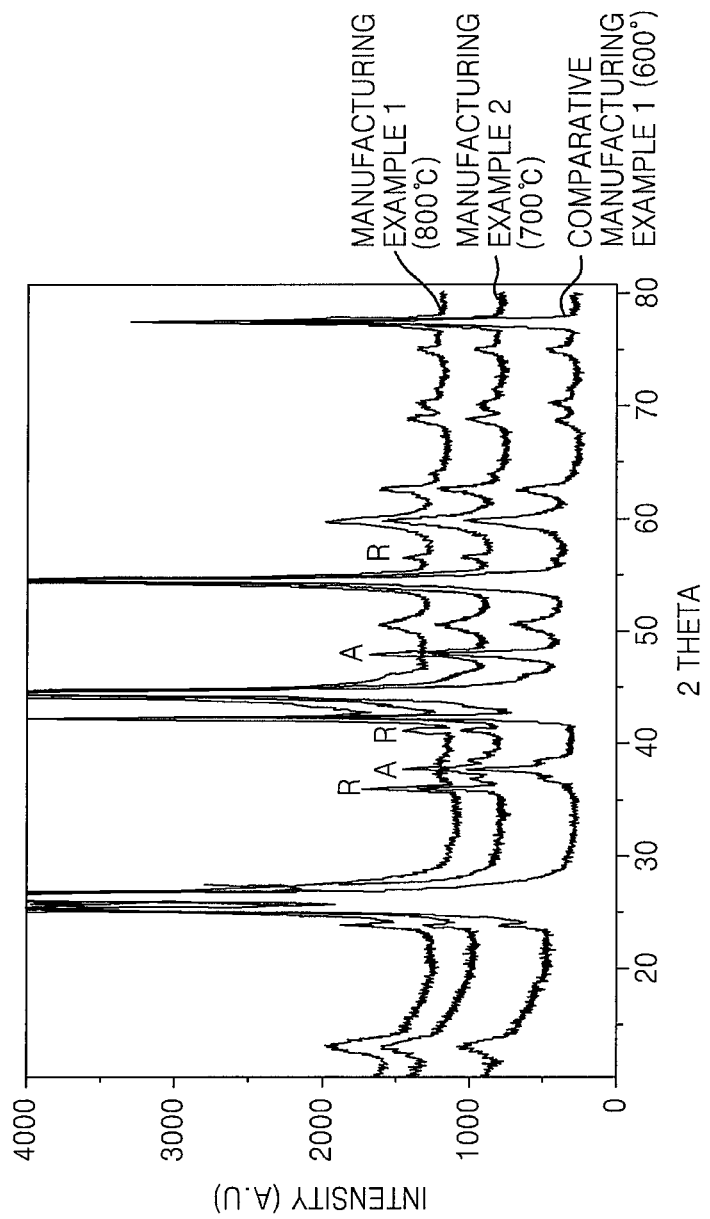
FIG. 5 shows x-ray diffraction (XRD) analysis results of the negative active material used in Manufacturing Examples 1 and 2 and Comparative Manufacturing Example 1.

FIG. 5 shows XRD analysis results of the negative active materials prepared in Manufacturing Example 1 and Comparative Manufacturing Example 1 obtained by using CuKα rays. In FIG. 5, R stands for a rutile phase and A stands for an anatase phase of TiO$_2$.

As shown in FIG. 5, graphite coated with titanium isopropoxide that is heat treated at a temperature of 800° C. shows TiO$_2$ only in a rutile phase and graphite coated with titanium isopropoxide that is heat treated at a temperature of 700° C. has TiO$_2$ in a mixture phase of rutile and anatase, and graphite heat treated at a temperature of 600° C. has TiO$_2$ only in an anatase phase.

Figure 6:
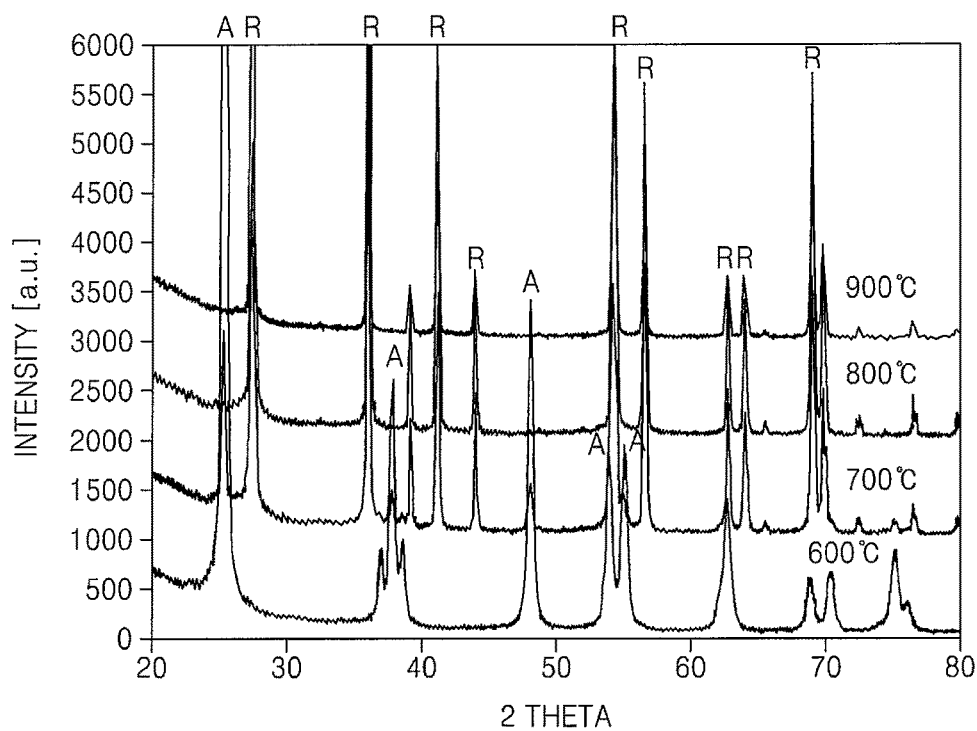
FIG. 6 shows XRD analysis results showing a crystalline phase of $TiO_2$ according to a heat treatment temperature.

In addition, to identify the change in a crystalline phase of TiO$_2$ according to a heat treatment temperature, a titanium isopropoxide solution removed of graphite was heat treated at a temperature of 600° C., 700° C., 800° C., and 900° C., and the TiO$_2$ nanoparticles obtained therefrom were subjected to an XRD analysis and the results obtained therefrom are shown in FIG. 6.

As shown in FIG. 6, a product obtained from heat treatment at a temperature of 800° C. (or higher) only showed a rutile phase and a product obtained from heat treatment at a temperature of 700° C. showed a mixed phase of rutile and anatase, and a product obtained from heat treatment at a temperature of 600° C. only showed an anatase phase. These results match the results obtained from FIG. 5.

Manufacturing Coin Half-cells

Coin half-cells were manufactured as follows to analyze changes in high temperature storage characteristics and thermal stability according to a TiO$_2$ coating:

EXAMPLE 1

The negative active material prepared in Manufacturing Example 1 and poly amide imide (PAI) as a binder were mixed at a weight ratio of 90:10 to prepare a negative active material slurry.

The negative active material slurry was coated on a copper foil current collector having a thickness of 10 μm at 9 mg/cm$^2$. The coated electrode plate was dried at a temperature of 120° C. for 15 minutes and then pressed to manufacture a negative electrode.

As a counter electrode, a Li metal was used; as a separator, a polyethylene separator (STAR 20, a product of Asahi) was used; and as an electrolyte, 1.15 M LiPF$_6$ dissolved in a mixture solvent of ethylene carbonate (EC): ethyl methyl carbonate (EMC): diethyl carbonate (DEC) (at a volume ratio of 3:3:4) was used (utilized) to manufacture a coin half-cell.

EXAMPLE 2

A coin half-cell was manufactured in the same manner as in Manufacturing Example 1, except that the negative active material of Manufacturing Example 2 was used instead of the negative active material of Manufacturing Example 1.

COMPARATIVE EXAMPLE 1

A coin half-cell was manufactured in the same manner as in Example 1, except that the negative active material of Comparative Manufacturing Example 2 was used instead of the negative active material of Manufacturing Example 1.

EVALUATION EXAMPLE 3

Evaluation of High Temperature Storage Characteristics

The coin half-cells manufactured in Example 2 and Comparative Example 1 were fully charged at 0.01 V (0.01 C cutoff) to store the same at a temperature of 90° C. for three days. A Solatron apparatus (model name: 1260 FRA) was used to measure the AC-impedance before and after storage at an alternating current of 0.5 mA in a range of about 1000 Hz to about 0.1 Hz, and the results obtained therefrom are shown in FIG. 7.

Figure 7:
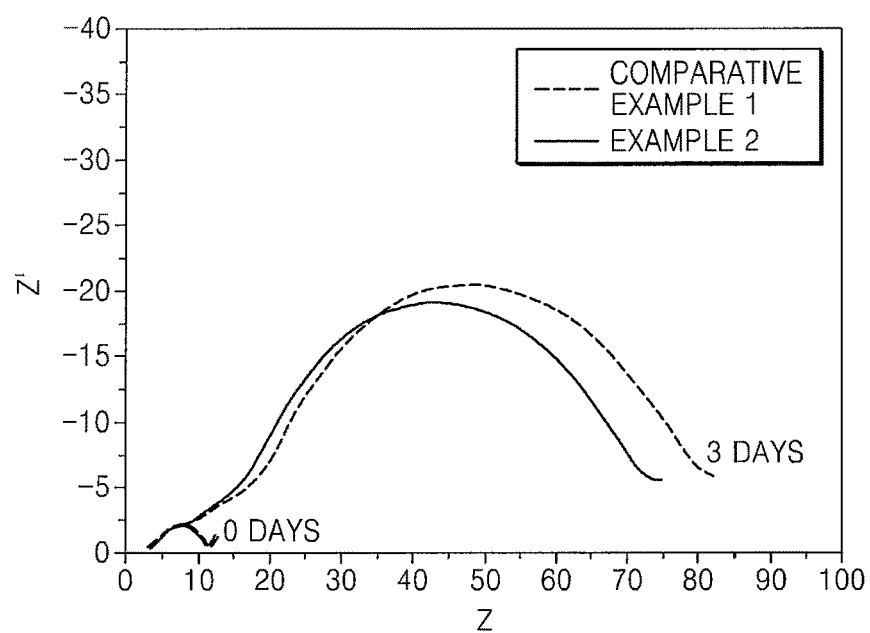
FIG. 7 shows impedance measurement results after high temperature storage of coin half-cells manufactured in Example 2 and Comparative Example 1.

As shown in FIG. 7, graphite coated with TiO$_2$ showed smaller increase in impedance at high temperature storage characteristics than graphite that is not coated with TiO$_2$. This shows that graphite coated with TiO$_2$ has improved high temperature storage characteristics than graphite not coated with TiO$_2$.

EVALUATION EXAMPLE 4

Evaluation of Thermal Stability

The coin half-cells manufactured in Example 1 and Comparative Example 1 were charged with a constant current at 0.1 C CC/CV until a voltage reached 4.3 V (vs. Li). After reaching the voltage of 4.3 V, the coin half-cells were charged at 4.3 V until a value of constant current was reduced to $\frac{1}{10}^{th}$ of the original value. After the charging, the coin half-cells were disassembled in a dry room, such that interference did not occur between two electrodes, and then a sampling on the mixture of a negative electrode was taken and the thermal stability thereof was evaluated. The evaluation of thermal stability was performed by differential scanning calorimetry (DSC) analysis, wherein temperatures of the mixture of a negative electrode were increased at intervals of 10° C. in a range of 30° C. to 400° C. to measure an amount of heat generated by the negative active material within the mixture of a negative electrode due to a reaction with an electrolyte according to temperature, which was converted into a mass unit.

Figure 8:
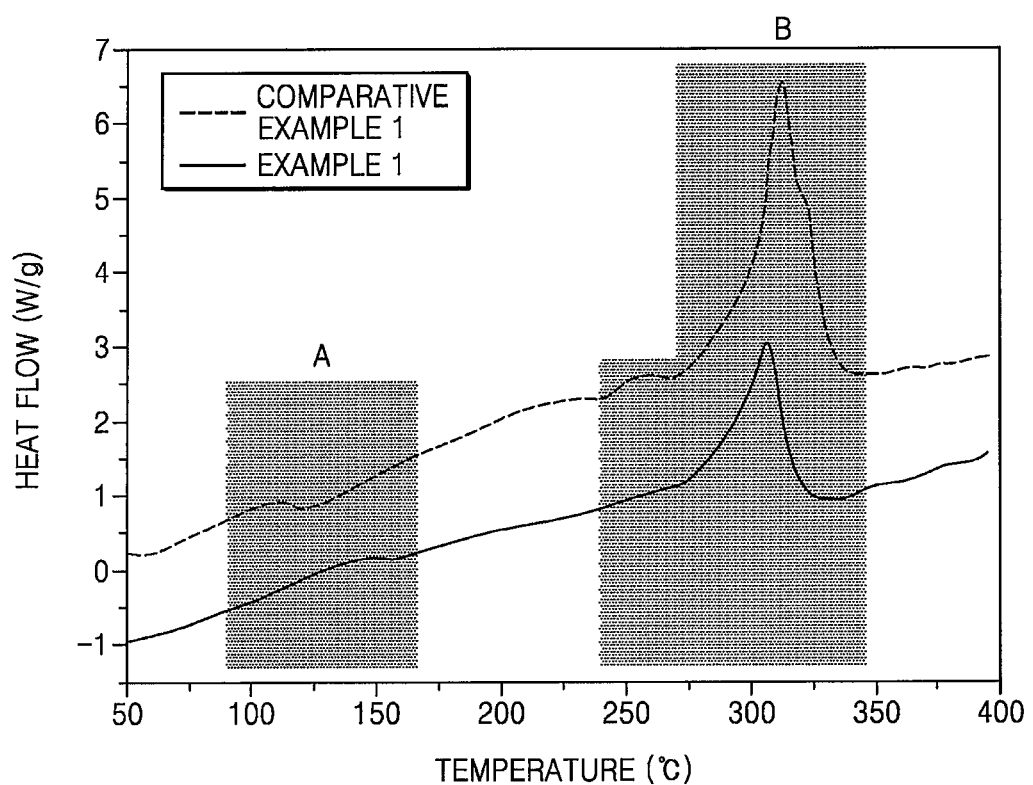
FIG. 8 shows thermal stability measurement results of coin half-cells manufactured in Example 1 and Comparative Example 1.

FIG. 8 shows DSC results of the coin half-cells manufactured in Example 1 and Comparative Example 1. Here, region A is a heat generation region of a film decomposition process and region B is a temperature (exothermal) region in which a charged negative active material is decomposed.

As shown in FIG. 8, a graphite negative active material coated with TiO$_2$ showed a smaller heat generation peak near 300° C. compared to the graphite negative active material that is not coated with TiO$_2$. This shows that lithiated TiO$_2$ has a more stable structure than lithiated graphite and thus, shows a smaller heat generation peak in region B. The results described above suggest that the thermal stability of the negative active material is improved due to the TiO$_2$ coating.

Manufacturing a Coin Full Cell

To evaluate high temperature lifespan characteristics, a coin full cell was manufactured as follows:

EXAMPLE 3

The negative active material manufactured in Manufacturing Example 1 was mixed with a binder (in which styrene butadiene rubber (SBR) was mixed with carboxymethyl cellulose (CMC) at a ratio of 1:1) at a ratio of 98:2 to prepare a negative active material slurry.

The negative active material slurry was coated on a copper foil current collector having a thickness of 10 μm at 9 mg/cm$^2$. After the coating, the coated electrode plate was dried at a temperature of 120° C. for 15 minutes, and then pressed to manufacture a negative electrode.

As a positive electrode, LiCoO$_2$ (LCO), which was a positive active material, carbon black, which was a conductor, and polyvinylidene fluoride (PVdF), which was a binder, were mixed at a weight ratio of 97.5:1:1.5 to prepare a positive active material slurry.

The positive active material slurry was coated on an aluminum foil current collector having a thickness of 12 μm at 18 mg/cm$^2$, and the coated electrode plate was dried at a temperature of 120° C. for 15 minutes, and then pressed to manufacture a positive electrode.

The above prepared positive electrode and the above prepared negative electrode, a polyethylene separator as a separator (STAR 20, a product of Asahi), and 1.15M LiPF$_6$ dissolved in a mixture solvent of EC:EMC:DEC (volume ratio of 3:3:4) as an electrolyte were used to manufacture a coin cell.

EXAMPLE 4

A coin full cell was manufactured in the same manner as in Example 1, except that the negative active material manufactured in Manufacturing Example 2 was used instead of the negative active material manufactured in Manufacturing Example 1.

COMPARATIVE EXAMPLE 2

A coin full cell was manufactured in the same manner as in Example 1, except that the negative active material manufactured in Comparative Manufacturing Example 1 was used instead of the negative active material manufactured in Manufacturing Example 1.

COMPARATIVE EXAMPLE 3

A coin full cell was manufactured in the same manner as in Example 1, except that the negative active material manufactured in Comparative Manufacturing Example 2 was used instead of the negative active material manufactured in Manufacturing Example 1.

EVALUATION EXAMPLE 5

Evaluation of High Temperature Lifespan Characteristics

To evaluate high temperature lifespan characteristics of the coin full cells manufactured in Examples 3 and 4 and Comparative Examples 2 and 3, each coin full cell was charged by using constant current at a 0.2 C rate until a voltage reached 0.01 V (vs. Li) at a temperature of 45° C., maintained at 0.01 V, and then charged at constant current until a current of 0.01 C was reached. Thereafter, the coin full cell was discharged at constant current of 0.2 C until a voltage of 1.5 V (vs. Li) was reached.

Thereafter, the coin full cell was charged at constant current at a current at a 0.5 C rate until a voltage of 0.01 V (vs. Li) was reached, maintained at 0.01 V, and then charged at constant current until a current of 0.01 C was reached. Thereafter, the coin full cell was discharged at a constant current of 0.5 C until a voltage of 1.5 V (vs. Li) was reached (formation process).

The coin full cells after the formation process were charged at constant current at a 1.0 C rate at a temperature of 60° C. until a voltage of 0.01 V (vs. Li) was reached, maintained at 0.01 V, and then charged at a constant current until a current of 0.01 C was reached. Thereafter, a cycle of discharging at a constant current of 1.0 C until a voltage of 1.5 V (vs. Li) was reached was repeated 50 times.

Figure 9:
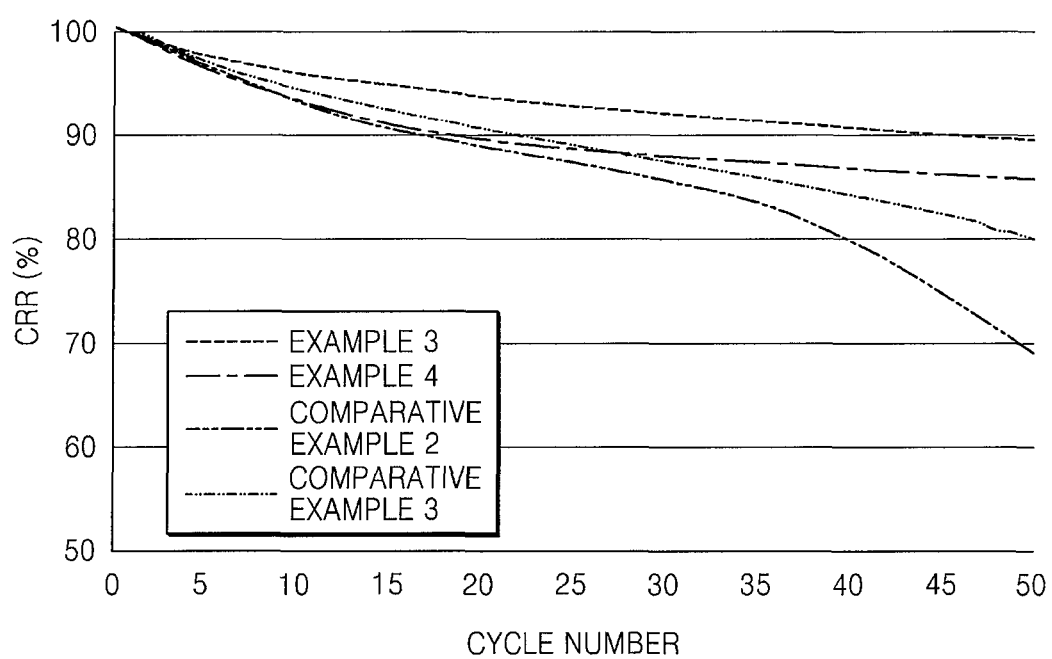
FIG. 9 is a graph showing high temperature lifespan characteristics of coin full cells manufactured in Examples 3 and 4 and Comparative Examples 2 and 3.

Capacity retention ratios (CRR) of the coin full cells manufactured in Examples 3 and 4, and Comparative Examples 2 and 3 at a high temperature are shown in FIG. 9. The CRR is defined by Equation 1 below.

Capacity retention ratio [%]=[discharge capacity in each cycle/discharge capacity in the first cycle]×100     Equation 1

As shown in FIG. 9, high temperature lifespan characteristics of the coin full cells including TiO$_2$ nanoparticles having a rutile structure (Example 3) and the coin full cell including TiO$_2$ nanoparticles in which a rutile structure and an anatase structure were mixed (Example 4) showed high temperature lifespan characteristics compared to the coin full cell in which graphite was not coated with TiO$_2$ nanoparticles (Comparative Example 3). However, the coin full cell including the TiO$_2$ nanoparticles having an anatase structure (Comparative Example 2) showed deteriorated high temperature characteristics compared to the coin full cell in which graphite was not coated with TiO$_2$ nanoparticles (Comparative Example 3).

As described above, according to the one or more of the above embodiments of the present invention, negative active materials may be used to improve high temperature stability and lifespan characteristics of a lithium battery.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A negative active material comprising:
   a crystalline carbonaceous substrate; and
   nanoparticles consisting of metal oxide, the nanoparticles dispersed on a surface of the crystalline carbonaceous substrate, and the nanoparticles having a rutile phase mixed with an anatase phase,
   wherein the crystalline carbonaceous substrate comprises at least one of natural graphite, artificial graphite, expandable graphite, carbon black, and fullerene soot,
   wherein each of the nanoparticles is spherical and an average diameter of the metal oxide nanoparticles is about 1 nm to about 30 nm, and
   wherein the nanoparticles form a coating layer having an island shape on a surface of the crystalline carbonaceous substrate.

2. The negative active material of claim 1, wherein the nanoparticles comprise at least one metal oxide of a metal selected from the elements of Group 2 to Group 13.

3. The negative active material of claim 1, wherein the nanoparticles comprise an oxide of at least one metal selected from the group consisting of zirconium (Zr), nickel (Ni), cobalt (Co), manganese (Mn), boron (B), magnesium (Mg), calcium (Ca), strontium (Sr), barium (Ba), titanium (Ti), vanadium (V), iron (Fe), copper (Cu), chromium (Cr), zinc (Zn), molybdenum (Mo), niobium (Nb), tantalum (Ta), and aluminum (Al).

4. The negative active material of claim 1, wherein the nanoparticles consists of at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

5. The negative active material of claim 1, wherein the nanoparticles comprise titanium oxide having a rutile structure.

6. The negative active material of claim 1, wherein the nanoparticles comprise a titanium oxide having a rutile structure mixed with an anatase structure.

7. The negative active material of claim 1, wherein the crystalline carbonaceous substrate has a spherical form, a planar form, a fiber form, a tube form, and/or a powder form.

8. The negative active material of claim 1, wherein an average diameter of the crystalline carbonaceous substrate is about 1 μm to about 30 μm.

9. The negative active material of claim 1, wherein an amount of the nanoparticles is about 0.01 parts by weight to about 10 parts by weight based on 100 parts by weight of the crystalline carbonaceous substrate.

10. A lithium battery comprising the negative active material according to claim 1 in a negative electrode.

11. A method of preparing the negative active material of claim 1, the method comprising:

mixing a crystalline carbonaceous substrate, a metal oxide precursor, and a solvent to prepare a mixture solution;

drying the mixture solution to prepare a dried product; and heat treating the dried product, wherein the heat treating is performed in a nitrogen atmosphere or an air atmosphere at a temperature of 700° C. or greater.

12. The method of claim 11, wherein the metal oxide precursor is a metal salt comprising at least one metal selected from the group consisting of titanium (Ti), zirconium (Zr), nickel (Ni), cobalt (Co), manganese (Mn), chromium (Cr), zinc (Zn), boron (B), magnesium (Mg), calcium (Ca), strontinum (Sr), barium (Ba), vanadium (V,) iron (Fe), copper (Cu), molybdenum (Mo), niobium (Nb), tantalum (Ta), and aluminum (Al).

13. The method of claim 11, wherein a weight ratio of the crystalline carbonaceous substrate to the metal oxide precursor is about 100:0.01 to about 100:20.

14. The method of claim 11, wherein the heat treating is performed in the nitrogen atmosphere or the air atmosphere at a temperature of about 700° C. to about 900° C.

* * * * *